(12) United States Patent (10) Patent No.: US 12,568,958 B2

Carmack (45) Date of Patent: Mar. 10, 2026

(54) WATERFOWL MOTION SIMULATION DEVICE

(71) Applicant: Anthony Carmack, Maumelle, AR (US)

(72) Inventor: Anthony Carmack, Maumelle, AR (US)

( * ) Notice: Subject to any disclaimer, the term of this patent is extended or adjusted under 35 U.S.C. 154(b) by 253 days.

(21) Appl. No.: 18/046,914

(22) Filed: Oct. 15, 2022

(65) Prior Publication Data

US 2023/0123980 A1 Apr. 20, 2023

Related U.S. Application Data

(60) Provisional application No. 63/256,569, filed on Oct. 16, 2021.

(51) Int. Cl.
A01M 31/06 (2006.01)
F16H 19/06 (2006.01)

(52) U.S. Cl.
CPC .............. A01M 31/06 (2013.01); F16H 19/06 (2013.01)

(58) Field of Classification Search
CPC ............................... A01M 31/06; F16H 19/06
USPC .............................................................. 43/3
See application file for complete search history.

(56) References Cited

U.S. PATENT DOCUMENTS

| | | |
|---|---|---|
| 811,036 A | 1/1906 | Cram |
| 1,789,649 A | 1/1931 | Gazecki |
| 2,747,814 A | 5/1956 | Taylor |
| 2,860,842 A | 11/1958 | Ryan |
| 3,079,719 A * | 3/1963 | Muszynski ........... A01M 31/06 |
| | | 43/3 |
| 4,674,219 A | 6/1987 | Chargo |
| (Continued) | | |

FOREIGN PATENT DOCUMENTS

FR 3037036 A1 12/2016

*Primary Examiner* — Brady W Frazier
(74) *Attorney, Agent, or Firm* — Bailey & Company, P.A.; Drew Bailey

(57) ABSTRACT

A waterfowl motion simulation device for affecting the motion of waterfowl decoys in an aquatic terrain is disclosed. The waterfowl motion simulation device includes a winding unit configured to wind and unwind a line assembly. The line assembly includes a main line with a plurality of decoy attachment appendages provided at various points along its length. The winding unit includes a motor accommodated inside a winding unit housing, and a winding implement rotatably supported outside the winding unit housing by an output shaft of the motor. A control unit electrically connected to the motor is operable to control the rotation of the winding implement to wind and unwind the line assembly by controlling the motor according to a rotational speed and timing indicated by user input received through at least one user interface. A power supply unit is removably engaged with, and electrically connected to the control unit through, a power supply interface on an exterior surface of the winding unit housing. The waterfowl motion simulation device preferably also includes a mounting assembly configured to adjustably support at least in part the power supply unit, power supply interface, winding unit, and control unit above an aquatic terrain. A method of using the waterfowl motion simulation device to affect the motion of at least one waterfowl decoy in an aquatic terrain is also described.

8 Claims, 8 Drawing Sheets

(56)                    References Cited

U.S. PATENT DOCUMENTS

| | | | | |
|---|---|---|---|---|
| 4,827,653 | A | 5/1989 | Sewell | |
| 4,910,905 | A | 3/1990 | Girdley | |
| 5,974,720 | A | 11/1999 | Bowling | |
| 6,079,140 | A | 6/2000 | Brock | |
| 6,374,529 | B1 | 4/2002 | Litman | |
| 6,412,210 | B1 | 7/2002 | Horrell | |
| 6,665,975 | B2 | 12/2003 | Porter | |
| 7,117,628 | B1 | 10/2006 | Bailey | |
| 7,322,144 | B2 | 1/2008 | Brewer | |
| 7,347,024 | B1 | 3/2008 | Vest | |
| 8,887,433 | B2 * | 11/2014 | Luttrull | A01M 31/06 43/2 |
| 9,160,211 | B2 | 10/2015 | Tanimoto | |
| 9,414,583 | B2 | 8/2016 | Burton | |
| 9,609,860 | B1 | 4/2017 | Slaughter | |
| 9,629,356 | B1 | 4/2017 | Frierson, II | |
| 9,756,847 | B1 * | 9/2017 | Williams | F16H 57/02 |
| 10,226,040 | B2 | 3/2019 | Kubinec | |
| 10,292,380 | B1 | 5/2019 | Deloach, III | |
| 2006/0207158 | A1 * | 9/2006 | Brewer | A01M 31/06 43/3 |
| 2008/0155878 | A1 * | 7/2008 | Myers | A01M 31/06 43/3 |
| 2013/0104443 | A1 | 5/2013 | Cramer | |
| 2015/0059229 | A1 | 3/2015 | Miller | |
| 2019/0246627 | A1 | 8/2019 | Frentz | |
| 2019/0250602 | A1 | 8/2019 | Deloach, III | |
| 2020/0229424 | A1 | 7/2020 | Smith | |
| 2020/0323196 | A1 | 10/2020 | Clark | |

* cited by examiner

WATERFOWL MOTION SIMULATION DEVICE

CROSS-REFERENCE TO RELATED APPLICATIONS

This application claims priority to U.S. Provisional Application No. 63/256,569 filed on Oct. 16, 2021, which is fully incorporated herein by reference.

STATEMENT REGARDING FEDERALLY SPONSORED RESEARCH OR DEVELOPMENT

Not applicable.

BACKGROUND DISCUSSION

Waterfowl decoys are widely used in the sport of waterfowl hunting to attract waterfowl. Waterfowl hunting often takes place in a wetland or another type of aquatic terrain, wherein the waterfowl decoys are distributed to float atop water in such terrain. To enhance the realisticness of the waterfowl decoys, their motion can be affected to simulate that of waterfowl, producing natural effects within the water, such as ripples. As a conventional means of doing so, waterfowl decoys have been attached to a common line, which can be pulled by a hunter to affect the motion of the waterfowl decoys. The hunter's movement in pulling the line, however, risks alerting waterfowl in the vicinity to the hunter's location.

Various devices have been used in connection with such a line configuration to automate the pulling of the line, which often include a spool rotatable by a battery-powered motor via an output shaft. In many instances, the spool, motor, and batteries are sealed within a common housing having an opening through which the line is connected to the spool. An issue presented by such a configuration is that debris and water adhered to the line can enter the housing as the line is wound with respect to the spool, presenting a risk of obstructing the functionality of the components inside the housing or subjecting them to damage. Another issue presented by such a configuration is the difficulty of replacing the batteries during a hunt. For example, environmental factors, such as water and low temperature, can compromise the hunter's dexterity and cause ice to form on such devices, rendering it difficult and tedious to disassemble such devices to the extent necessary to replace the batteries. Further, the motors of such devices often include a gear drive to drive rotation of the output shaft, which, in operation, produces a noise that can deter waterfowl. The waterfowl motion simulation device of the present disclosure solves one or more of the issues set forth above.

SUMMARY

One aspect of the present invention is directed to a waterfowl motion simulation device that includes a winding unit controlled by a control unit to perform rotational operations to wind and unwind a line assembly connected to waterfowl decoys in an aquatic terrain. The winding unit includes a motor that is accommodated in a winding unit housing, and a winding implement that is rotatably supported outside the winding unit housing by an output shaft of the motor. A power supply unit is removably engaged with a power supply interface on an exterior surface of the winding unit housing, and is operable to supply a voltage to the control unit via the power supply interface. The control unit includes at least one user interface and is configured to control rotational operations of the winding unit by controlling the motor to rotate the winding implement according to user input indicative of rotational speed and timing received via the at least one user interface. The line assembly may include a main line having a plurality of decoy attachment appendages connected along its length and connectable to an anchor via an anchor appendage. Waterfowl decoys may be removably connected to the main line via the decoy attachment appendages such that their motion is affected in the aquatic terrain by winding and unwinding the line assembly with respect to the winding implement in response to rotational operations of the winding unit. Embodiments of this aspect may also include a mounting assembly configured to support at least in part the power supply unit, power supply unit, winding unit, and control unit above the aquatic terrain. The mounting assembly may include an adjustment sleeve connected to the exterior surface of the winding unit housing, and a main support structure configured to be slidably received by the adjustment sleeve. A locking mechanism may be operably associated with the adjustment sleeve to releasably lock the main support structure within the adjustment sleeve at a point along the length of the main support structure.

In another general aspect, the present invention is directed to a method of using the waterfowl motion simulation device to affect the motion of at least one waterfowl decoy in an aquatic terrain. The method includes positioning the waterfowl motion simulation device above the aquatic terrain at a distance from an anchor, connecting the main line of the line assembly to the anchor via the anchor appendage, and connecting the at least one waterfowl decoy to the main line via at least one of the plurality of decoy attachment appendages. The method also includes providing user input indicative of rotational speed and timing of rotational operations of the winding unit to the control unit via the at least one user interface, and outputting from the control unit to the motor a motor control signal based on the user input. The method also includes the motor, based on the motor control signal, applying torque to the winding implement in a first rotational direction for a first time interval to perform a first rotational operation of rotating the winding implement in the first rotational direction, and, by rotating the winding implement in the first rotational direction, winding the line assembly with respect to the winding implement to move the at least one waterfowl decoy in the aquatic terrain. The method also includes the motor, based on the motor control signal, stopping application of torque to the winding implement for a second time interval, upon expiration of the first time interval, to perform a second rotational operation of rotating the winding implement in a second rotational direction in response to torque applied to the winding implement by the line assembly, and, by rotating the winding implement in the second rotational direction, unwinding the line assembly with respect to the winding implement to move the at least one waterfowl decoy in the aquatic terrain. The method may also include repeating steps, after the expiration of the second time interval, to perform the rotational operations of the winding unit at least one more time.

DETAILED DESCRIPTION

Figure 1:
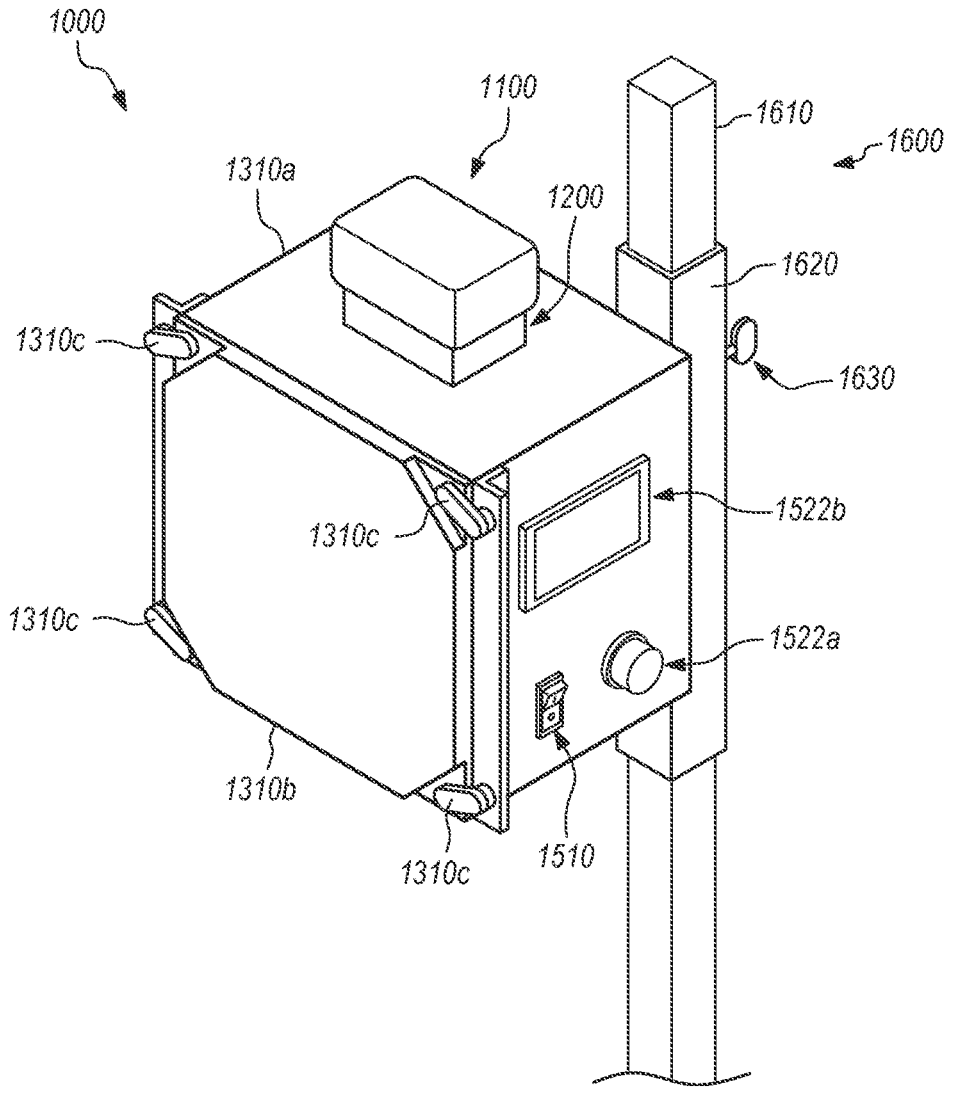
FIG. 1 is a perspective view showing the rear side of the waterfowl motion simulation device of an embodiment of the present invention, including a power switch, speed input device, and speed output device of the control unit.

Embodiments of the present invention will be disclosed herein in detail with reference to FIGS. 1, 2, 3, 4, 5, 6, 7, and 8. For simplicity and clarity of illustration, elements indicated therein are not necessarily drawn to scale, and reference labels have been repeated thereamong to indicate analogous elements. Each embodiment is disclosed for the purpose of enabling a person of ordinary skill in the art to appreciate and understand the principles and practices of the present invention. It is to be understood, however, that all of such embodiments are merely examples and shall not be construed as limiting the scope of the present invention.

The present invention is directed generally to a waterfowl motion simulation device 1000. The waterfowl motion simulation device 1000 functions to affect the motion of waterfowl decoys 1800 distributed in a body of water, such as a lake, pond, wetland, stream, canal, or river. Each waterfowl decoy 1800 may be embodied by a hull defining an inner cavity and shaped to imitate the periphery of a species of waterfowl, such as a duck, goose, or other aquatic bird. Each hull may be made of wood, a polymer (such as polyethylene or polyvinyl chloride), or any other material known in the art as suitable for forming a waterfowl decoy 1800 of sufficient buoyancy to remain substantially afloat in a body of water.

The waterfowl motion simulation device 1000 includes a power supply unit 1100, a power supply interface 1200, a winding unit 1300, a line assembly 1400, an anchor 1700, and a control unit 1500. In a preferred embodiment, the waterfowl motion simulation device 1000 may also include a mounting assembly 1600.

The power supply unit 1100 of the waterfowl motion simulation device 1000 includes a power supply housing 1110, a power supply 1120, and a power supply circuit 1130. The power supply housing 1110 accommodates the power supply 1120 and power supply circuit 1130. The power supply housing 1110 is formed by a container made of a polymer, such as polyethylene, or other material resilient to the deteriorative effects of exposure to various atmospheric and environmental conditions, such as water or ultraviolet ray exposure. The power supply housing 1110 is configured to support the power supply 1120 and the power supply circuit 1130 on the power supply interface 1200. The power supply housing 1110 includes a support portion 1130 configured to removably engage with a corresponding support portion 1211 of the power supply interface 1200. In one embodiment, for example, the support portion 1130 of the power supply housing 1110 is formed by a rectangular shaped protrusion adapted to removably engaged with a U-shaped recess of the support portion 1211 of the power supply interface 1200.

The power supply 1120 is configured to output a voltage to power constituent elements of the waterfowl motion simulation device 1000, such as the winding unit 1300 and the control unit 1500 (said voltage may be referred to herein as the "supply voltage"). The power supply 1120, for example, may be embodied by one or more battery cells, such as lead-acid, lithium-ion, nickel-cadmium, nickel metal hydride, or molten salt battery cells. In one embodiment, the power supply 1120 is embodied by lithium-ion battery cells that output a 20-volt direct current voltage, but battery cells with different compositions and voltage outputs may be implemented to facilitate operability with variations of the constituent elements of the waterfowl motion simulation device 1000. The power supply 1120 is electrically connected to the power supply circuit 1130 to output the supply voltage to the power supply circuit 1130.

The power supply circuit 1130 applies the supply voltage of the power supply 1120 to the control unit 1500 through the power supply interface 1200. The power supply interface 1200 includes a power supply interface housing 1210 and a power supply interface circuit 1220 accommodated in the power supply interface housing 1210. The power supply interface housing 1210 may be formed of a polymer separately from a winding unit housing 1310 to be described hereinafter or as a unitary part of the winding unit housing 1310. The power supply interface housing 1210 includes a support portion 1211 adapted to removably engage with the support portion 1130 of the power supply housing 1110 and support the power supply unit 1100 on the exterior surface of the winding unit housing 1310.

Each of the power supply circuit 1130 and the power supply interface circuit 1220 includes a terminal assembly. Each terminal assembly has terminals, including, for example, input terminals 1222 and output terminals 1120. Output terminals 1120 of the power supply circuit 1130 may be electrically connected to input terminals 1222 of the power supply interface circuit 1220 to output the supply voltage from the power supply circuit 1130 to the power supply interface circuit 1220. For example, output terminals 1120 of the power supply circuit 1130 may be embodied by terminal sockets, such as slots, holes or the like, that receive input terminals 1222 of the power supply interface circuit 1220 embodied by terminal blades, pins, loops or the like exposed through a surface of the support portion 1211 of the power supply interface housing 1210.

Output terminals 1120 of the power supply interface circuit 1220 may be electrically connected to the control unit 1500 via wired communication link, such as insulated copper wires, to output the supply voltage to control modules 1520, 1530 of the control unit 1500 to be described herein. As will also be more fully described herein, the control unit 1500 may be controlled to modulate the pulse width of the supply voltage based on user input and output a motor control signal to affect rotational operations of the winding unit 1300.

The winding unit 1300 includes a motor 1320, a motor circuit 1330, a winding unit housing 1310, a winding implement 1360, and a winding implement cover 1370. The winding unit housing 1310 is formed by a cover 1310b and a container 1310a, each of which are made of a polymer (such as polyethylene) or any other material resilient to the deteriorative effects of exposure to various atmospheric and environmental conditions, such as water and ultraviolet-ray exposure. The container 1310a has an opening defined by a rim. The cover 1310b may be connected to the rim of the container 1310a to define an inner cavity 1310d that accommodates the motor 1320 and control modules 1520, 1530 of the control unit 1500. The cover 1310b may be removably or hingedly connected to the rim of the container 1310a to facilitate access to the inner cavity 1310d. For example, a ledge may be formed around the periphery of, and slightly lower than, the rim, and a plurality of claw elements 1310c may be rotatably secured in surfaces of the ledge at corners thereof. When the interior surface 1310b2 of the cover 1310b is positioned over and in contact with the rim of the container 1310a, the claw elements 1310c may be rotated to securely fit over an exterior surface of the cover 1310b, thereby securing the cover 1310b to the container 1310a.

In a preferred embodiment, the cover 1310b may be adapted to sealingly engage with the rim of the container 1310a to impede liquid from entering the inner cavity 1310d, which may cause damage to constituent elements of the present invention accommodated therein. For example, a recess configured to receive the rim of the container 1310a may be formed in the interior surface 1310b2 of the cover 1310b. A collar 1310b3 configured to sealingly engage with the rim may be provided inside the recess. The collar 1310b3 may, for example, be embodied by a strip or tube of an elastomeric material, such as ethylene propylene diene monomer, with sufficient elasticity to sealingly conform to the rim in response to compressive stress occurring between the rim and the collar 1310b3. Such compressive stress may occur, for example, when the rim is positioned inside the recess of the cover 1310b so as to be in contact with the collar 1310b3 and the claw elements 1310c are securely fitted over the exterior surface 1310b1 of the cover 1310b as previously described herein.

A circular aperture may be formed in a surface of the winding unit housing 1310 such that an output shaft 1324 of the motor 1320 to be described hereinafter may protrude from the winding unit housing 1310. An elastomeric bushing may be provided within or around the circular aperture of the winding unit housing 1310 so as to closely fit around the outer peripheral surface of the output shaft 1324, thereby facilitating the prevention of liquid from entering the inner cavity 1310d of the winding unit housing 1310.

As noted, the winding unit housing 1310 accommodates the motor 1320. For clarity, embodiments of the present invention will hereinafter be described based on an exemplary brushless direct current motor ("DC motor") with reference to FIGS. 5 and 6, but the scope of the present invention is not limited to such embodiment of a brushless DC motor. Indeed, the motor 1320 may be constituted by any suitable electric motor, including, for example, a brushed, brushless, or coreless DC motor.

In general, the motor 1320 includes a motor body 1322, an output shaft 1324, a rotor 1326, and a stator 1328. The motor body 1322 defines an inner cavity and is formed of a metal, an alloy, a resin, or other suitable material. A circular aperture is formed in the center of a surface of one end of the motor body 1322 and extends in the axial direction to the inner cavity of the motor body 1322.

Figure 6:
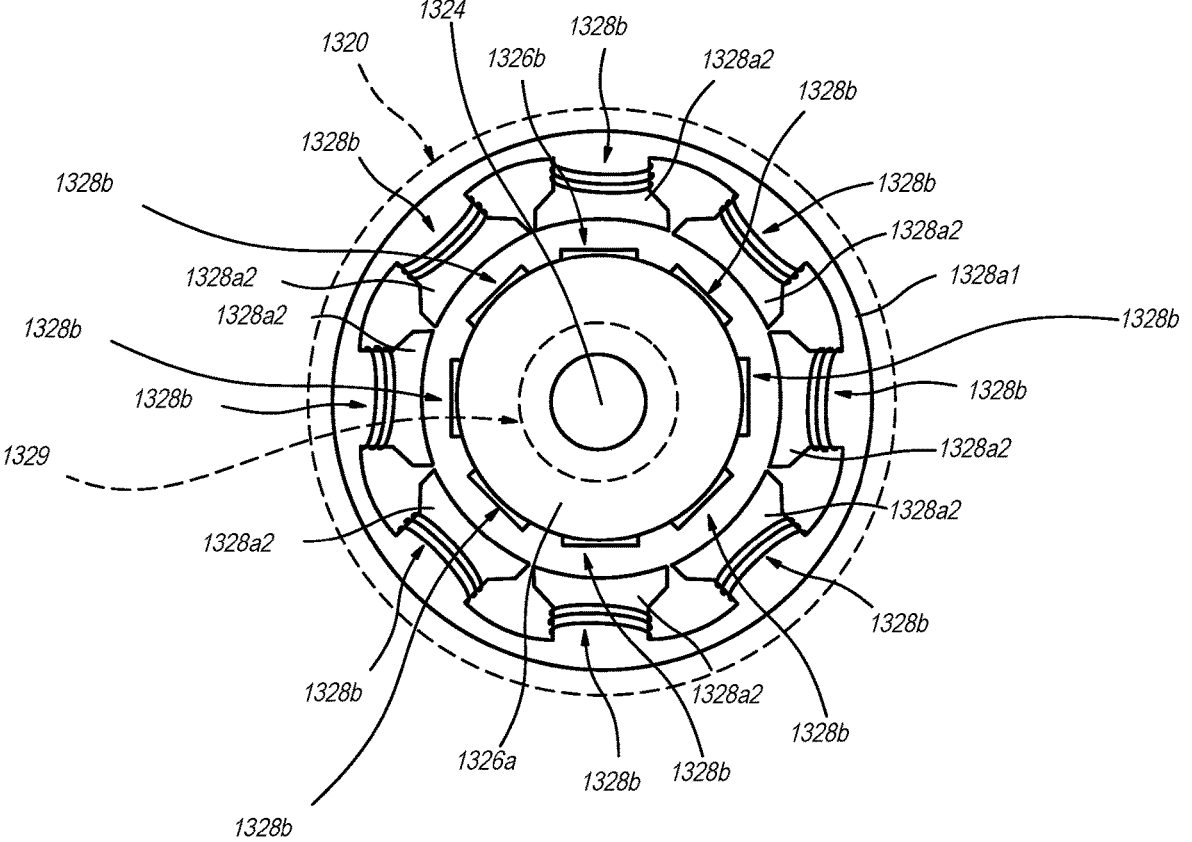
FIG. 6 is a side view showing the rotor, stator, and output shaft of the motor of the waterfowl motion simulation device of an embodiment of the present invention.
Figure 7:
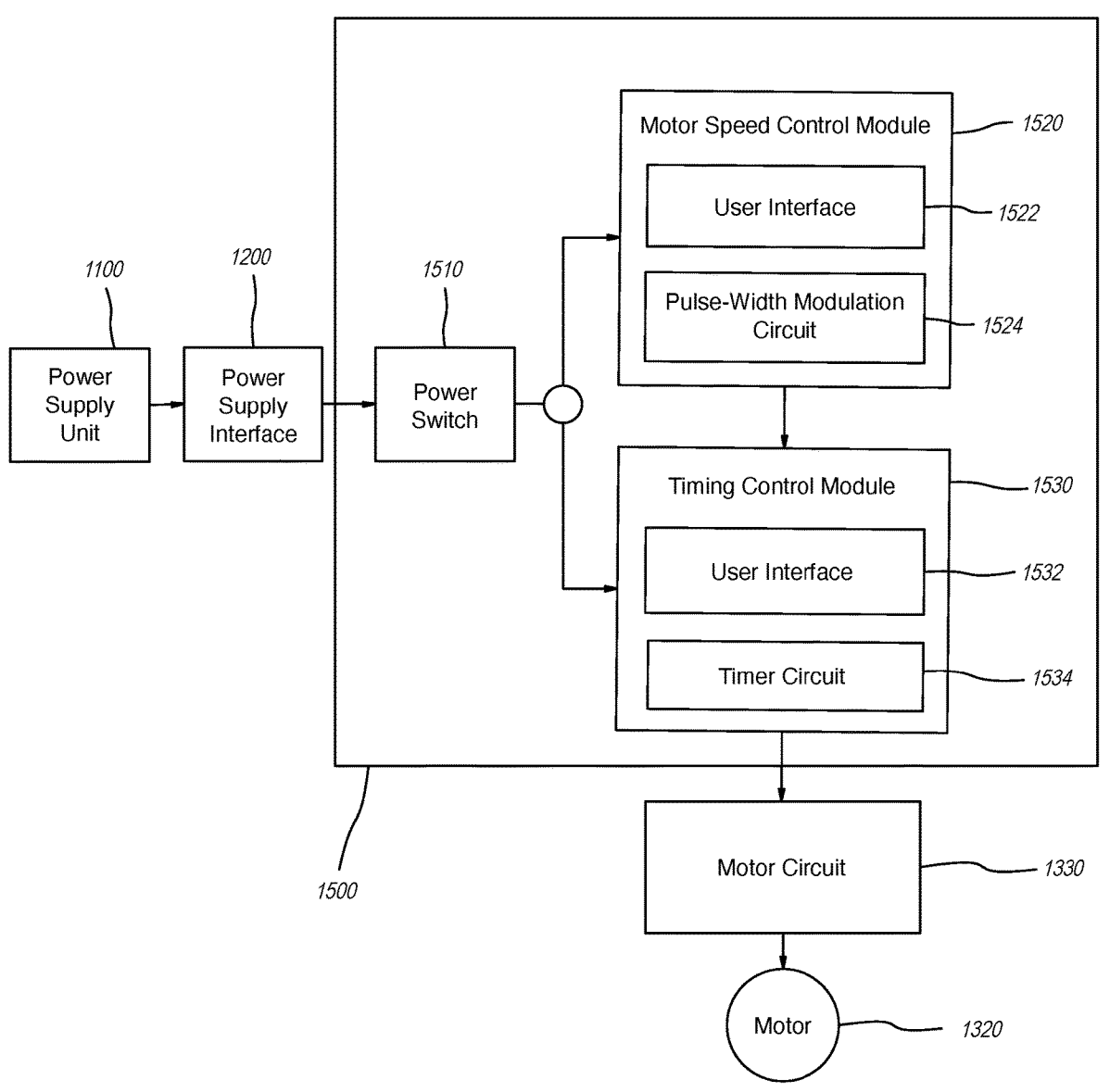
FIG. 7 is a schematic illustration of an exemplary embodiment of the power supply unit, the power supply interface, the control unit, the motor, and the motor circuit of the waterfowl motion simulation device of an embodiment of the present invention.

Referring to FIG. 6, the motor body 1322 accommodates the rotor 1326 and the stator 1328. The rotor 1326 functions to rotate the output shaft 1324 based on magnetic interaction with the stator 1328. The rotor 1326 may include a cylindrical core member 1326c, and a plurality of permanent magnets 1326b bonded to a peripheral surface of the core member 1326c at substantially equal distances apart in the circumferential direction. The core member 1326c of the rotor 1326 is operatively associated with the output shaft 1324 such that rotation of the rotor 1326 induces corresponding rotation of the output shaft 1324. For example, an axial bore may be formed to extend through the center of the core member 1326c in an axial direction and securely fitted over the output shaft 1324 on or near a first end thereof. The second end of the output shaft 1324 protrudes from the motor body 1322 and the winding unit housing 1310 through the respective circular apertures formed therein. Rotatable support members 1329, such as bearings, may be provided within the motor body 1322 to rotatably support the output shaft 1324.

The stator 1328 facilitates rotation of the rotor 1326 by generating magnetic fields according to a driving voltage signal input from the motor circuit 1330. As shown in FIG. 6, The stator 1328 may include a stator housing 1328a, and windings 1328b that correspond to a plurality of phases of the motor 1320 (e.g., U, V, and W phases). The stator housing 1328a may be embodied, for example, by a stator yoke 1328a1 and a plurality of ferromagnetic field poles 1328a2 formed to protrude from the stator yoke 1328a1 in an inward diametrical direction. The field poles 1328a2 may be arranged at substantially equal distances apart in a circumferential direction. Each winding 1328b includes one or more electrically-conductive wires, such as copper wires. One or more winding(s) 1328b may be coiled around each armature to facilitate the generation of a magnetic field upon application of a voltage to the windings 1328b. The rotor 1326 may be positioned within a space defined by the field poles 1328a2 such that the magnetic fields generated by the windings 1328b of the stator 1328 and the permanent magnets 1326b of the rotor 1326 may interact to induce rotation of the rotor 1326 and output shaft 1324.

For example, according to a driving voltage signal to be described hereinafter, magnetic fields may be generated sequentially through the windings 1328b in each phase of the motor 1320 to interact with the magnetic field(s) of the permanent magnet(s) of the rotor 1326 to induce rotation of the rotor 1326 and the output shaft 1324 in a first rotational direction, generating torque in the first rotational direction. For clarity, the present invention is described herein based on a motor driven in a first rotational direction, but the motor 1320 is not limited to being driven in the first rotational direction. Indeed, the direction of the current may be reversed via logic circuitry, such as an h-bridge circuit configuration, to drive the motor 1320 in a second rotational direction opposite the first rotational direction.

The winding implement 1360 functions to rotate in response to torque received from the motor 1320 and the line assembly 1400 to wind and unwind a length of the line assembly 1400. For example, the winding implement 1360 may be embodied by a spool having a circular aperture formed in its center passing in an axial direction. The circular aperture may be securely fitted over the second end of the output shaft 1324 via any suitable connecting means, such as adhesives, mechanical fasteners, and/or couplings, to receive torque generated by the motor 1320. Torque generated by the motor 1320 may thereby be applied to the winding implement 1360 via the output shaft 1324 to drive rotation of the winding implement 1360.

The winding implement 1360 is typically substantially covered by the winding implement cover 1370 such that rotational operations of the winding implement 1360 are substantially concealed from the sight of waterfowl. The winding implement cover 1370 may be made of a polymer and removably attached to an exterior surface of the winding unit housing 1310 by mechanical fasteners or any other suitable means. An opening is formed in a front side surface of the winding implement cover 1370 so that the line assembly 1400 can be connected to the winding implement 1360. The opening is also of sufficient size to generally allow any debris within the winding implement cover 1370 to be manually removed without detaching the winding implement cover 1370 from the winding unit housing 1310.

Figure 2:
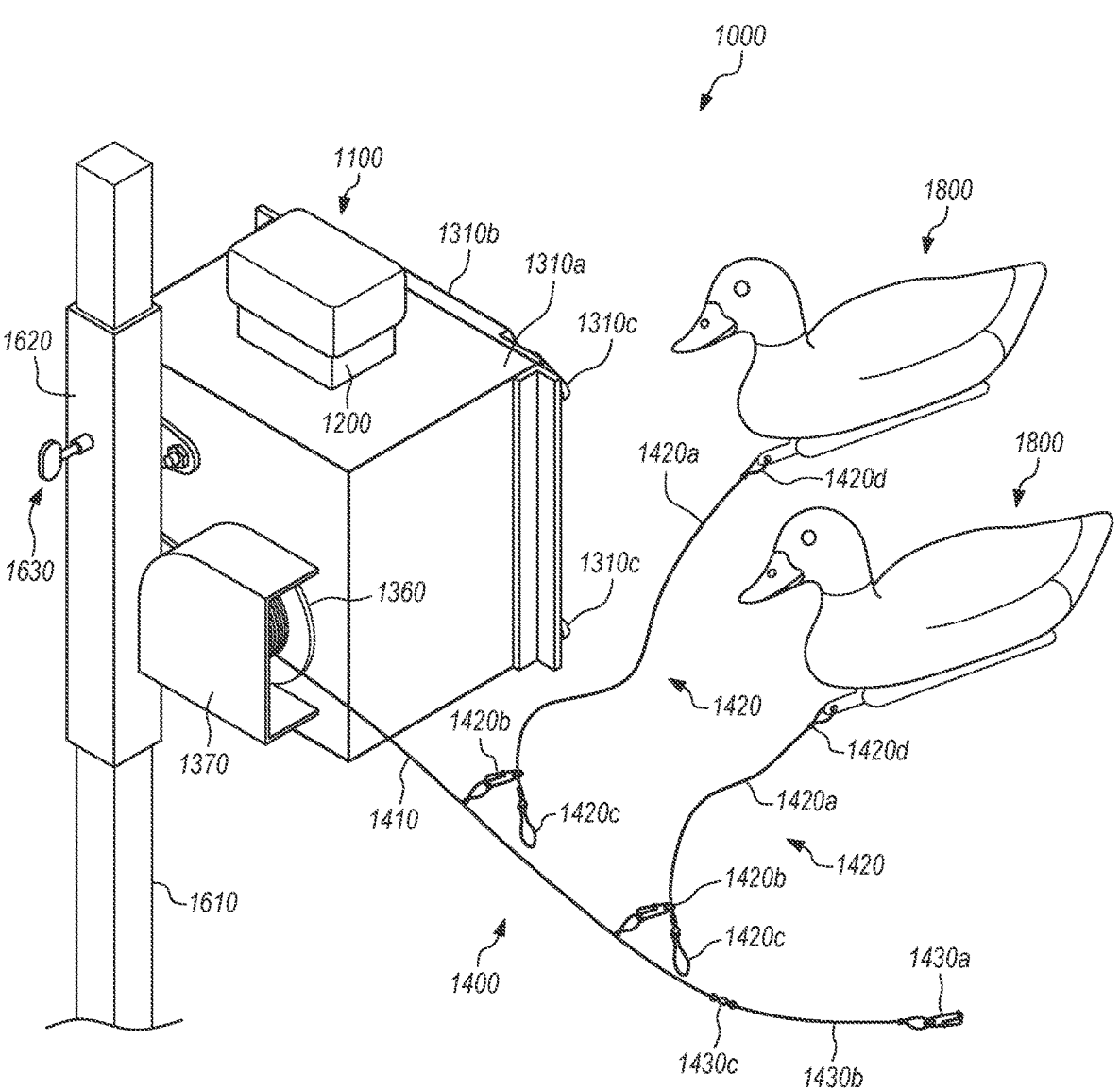
FIG. 2 is a perspective view showing the waterfowl motion simulation device of an embodiment of the present invention with waterfowl decoys attached to the line assembly.
Figure 3:
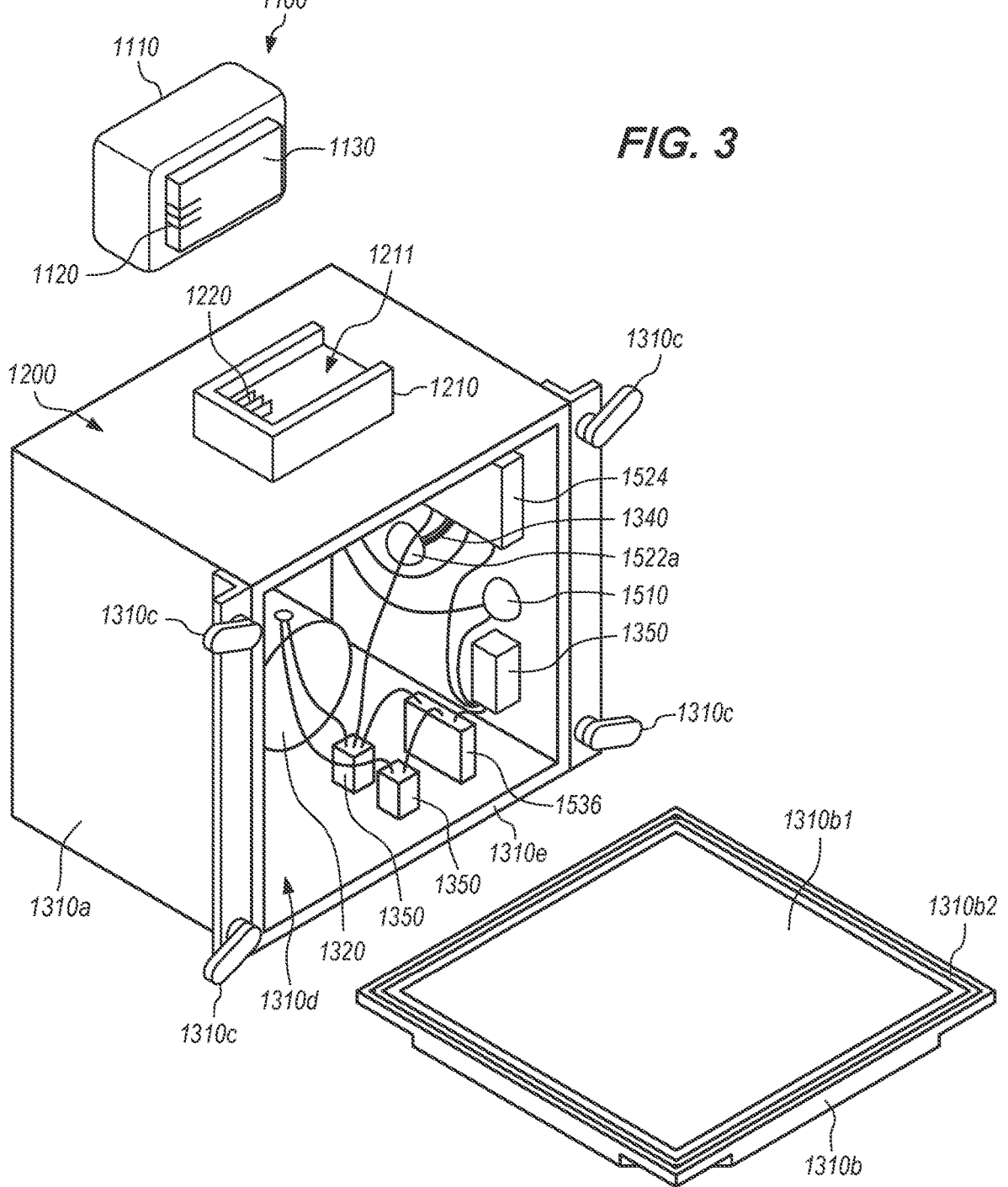
FIG. 3 is a perspective view showing the waterfowl motion simulation device of an embodiment of the present invention with the cover removed from the container of the winding unit housing and the power supply unit removed from the power supply interface.

The line assembly 1400 includes a main line 1410, a plurality of decoy attachment appendages 1420, and an anchor appendage 1430. The main line 1410 is made of a material sufficiently flexible to be wound, arranged, or otherwise manipulated around the outer peripheral surface of the winding implement 1360 in a circumferential direction, such as string, nylon, polyvinylidene fluoride, polyethylene, or any sufficiently elastic polymer. Various portions of the main line 1410 may be manipulated or otherwise adapted to provide points at spaced apart intervals along the length of the main line 1410 at which the decoy attachment appendages 1420 can be connected. For example, as illustrated in FIG. 2, various portions of the main line 1410 may form a loop or ring to which each decoy attachment appendage 1420 can be connected via a clip 1420b. In one embodiment, the length of the main line 1410 is 25 feet, but other lengths may be implemented to allow more or less waterfowl decoys 1800 to be attached and to facilitate use in various environments. The first end of the main line 1410 is inserted through the opening in the winding implement cover 1370 and secured to or within the surface of the winding implement 1360, while the second end of the main line 1410 is attached to the anchor appendage 1430.

The anchor appendage 1430 is configured to secure the second end of the main line 1410 to an anchor 1700. The anchor appendage 1430 generally includes at least one mechanical connector 1430a, 1430c, such as one or more clips, configured to removably connect the main line 1410 to the anchor 1700. In some embodiments, the anchor appendage 1430 also includes an elastic line 1430b, such as an elastic cord, tube, band or the like, to elastically secure the main line 1410 to the anchor 1700 in conjunction with the at least one mechanical connector 1430a, 1430c. The elasticity of the elastic line 1430b of the anchor appendage 1430 functions to create greater material displacement within the line assembly 1400 near the anchor 1700 which can facilitate greater motion of the waterfowl decoys 1800 during operations to be described herein. As shown in FIG. 2, in one embodiment, the anchor appendage 1430 may be constituted by a swivel clip 1430c attached to the second end of the main line 1410, an elastic line 1430b attached to the swivel clip 1430c, and a clip 1430a attached to the elastic line 1430b for connecting to the anchor 1700.

Figure 4:
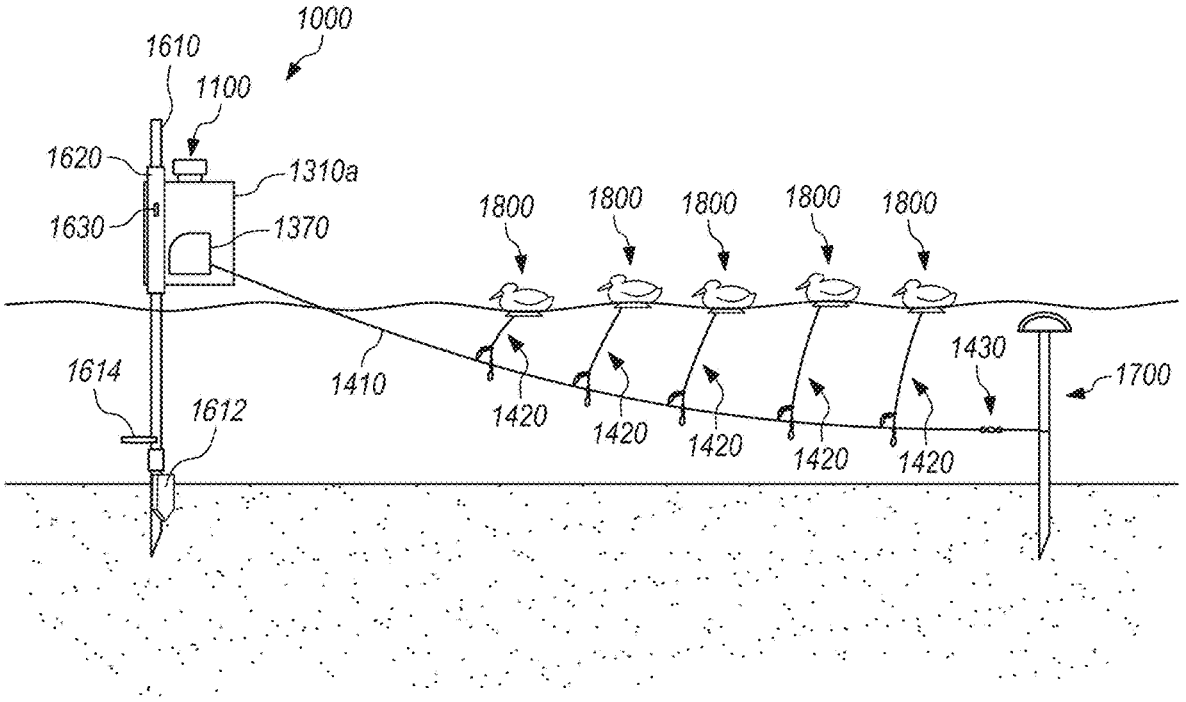
FIG. 4 is a side view of the waterfowl motion simulation device of an embodiment of the present invention implemented in a body of water.
Figure 5:
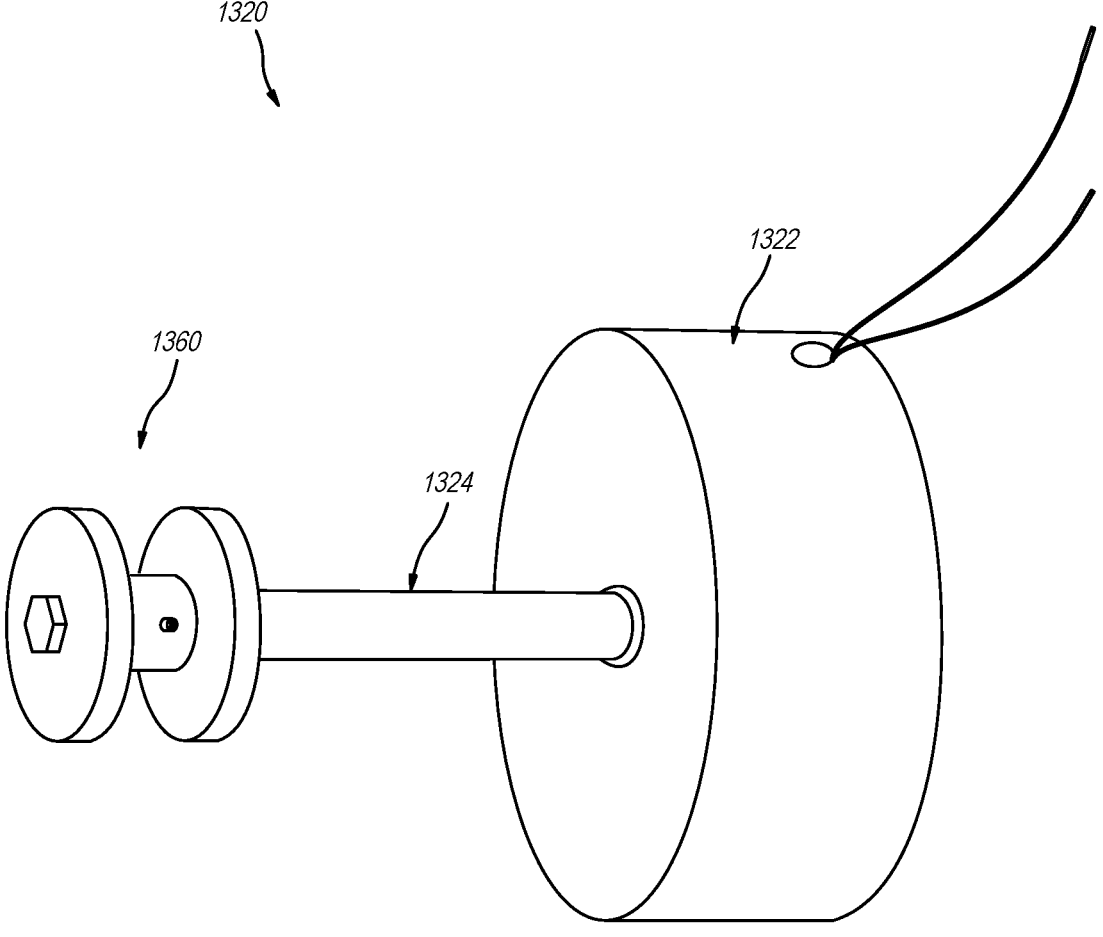

The anchor 1700 may include any inanimate object configured to remain in a substantially fixed position as a tensile force occurs within the line assembly 1400 in response to a maximum torque applied to the winding implement 1360 by the motor 1320. For example, the inanimate object of the anchor 1700 may be embodied by a natural inanimate object (or "natural anchor"), such as a tree, or, as shown in FIG. 4, an artificial inanimate object (or "artificial anchor"), such as a stake.

In operation, the second end of the main line 1410 is anchored such that the main line 1410 remains sufficiently taut between the anchor 1700 and the winding implement 1360 to affect the motion of attached waterfowl decoys 1800 in response to being wound and unwound by the winding unit 1300 as described herein. Waterfowl decoys 1800 are attached to the main line 1410 via the decoy attachment appendages 1420. Each decoy attachment appendage 1420 includes a line with a first end and a second end opposite the first end. The line of each decoy attachment appendage 1420 is formed of material sufficiently flexible to be arranged or manipulated into a knot or loop, such as string, nylon, polyvinylidene fluoride, or polyethylene.

A waterfowl decoy 1800 may be removably connected to the first end of the line of each decoy attachment appendage 1420. For example, the first end of the line of each decoy attachment appendage 1420 may be directly tied or crimped to a waterfowl decoy 1800. Alternatively, the first end of the line of each decoy attachment appendage 1420 may be connected to a waterfowl decoy 1800 indirectly via any other suitable means, such as a chemical bonding agent (such as an adhesive), or a mechanical connector (such as a fastener, bracket, clip, or the like).

The line of each decoy attachment appendage 1420 may also be removable connected to the main line 1410 of the line assembly 1400 via a clip, such as a swivel clip. For example, each clip may include an eye portion and a closable hook. The second end of the line of each decoy attachment appendage 1420 may be inserted through and slidably received by the eye portion of a respective clip. Weight elements 1420c, such as lead or cast iron egg weights, that each have a cross sectional area that exceeds the respective diameters of the eye portions of the clips may be connected respectively to the second end of the line of each decoy attachment appendage 1420, for example, to prevent each line from exiting the eye portion of a respective clip. The closable hook of each clip may be hooked and closed around one of the portions of the main line 1410 of the line assembly 1400 that forms a point of connection for the decoy attachment appendage 1420 (e.g., a loop or ring). As an alternative, it is to be understood that the line of each decoy attachment appendage 1420 may be directly tied to the main line 1410 of the line assembly 1400 or indirectly connected to the main line 1410 by any suitable means known in the art, including, for example, chemical bonding agents (such as adhesives) or mechanical connectors (such as fasteners, brackets, other clips and the like).

The control unit 1500 controls the rotational operations of the winding unit 1300 according to user input. The control unit 1500 includes a power switch 1510, a motor speed control module 1520, and a timing control module 1530. For clarity, the motor speed control module 1520 and the timing control module 1530 may herein be referred to collectively as the "control modules 1520, 1530" when unnecessary to distinguish therebetween.

The power switch 1510 may be interposed between the power supply interface 1200 and the control modules 1520, 1530 to selectively set on or off the supply voltage input to the control modules 1520, 1530 from the power supply interface 1200. The power switch 1510 may be provided on the exterior surface of the winding unit housing 1310.

The motor speed control module 1520 is operable to generate a PWM voltage signal to drive the motor 1320 at a rotational speed indicated by user input. The motor speed control module 1520 includes a user interface 1522, a pulse width modulation circuit ("PWM circuit") 1526, and a PWM circuit housing 1524.

The user interface 1522 of the motor speed control module 1520 includes at least one speed input device 1522a to receive user input indicative of a desired rotational speed of the motor 1320. Each speed input device 1522*a* may be embodied by a knob, dial, wheel, lever, button, touch-screen display, or any other device capable of receiving user input, which generally has indicia that signifies, for example, a rotational speed or a duty ratio. At least one speed input device 1522*a* may be provided such that it is accessible outside the winding unit housing 1310. For example, as shown in FIG. 1, at least one speed input device 1522*a* may be embodied by a dial rotatably embedded in the exterior surface of the winding unit housing 1310. The user interface 1522 of the motor speed control module 1520 may also include one or more speed output devices 1522*b*, such as a display, speaker, or any other device capable of presenting output information that signifies, for example, a rotational speed or a duty ratio.

Based on user input indicative of a desired rotational speed received through a speed input device 1522*a*, the user interface 1522 may generate and output to the PWM circuit 1526 a motor speed instruction signal. The motor speed instruction signal has rotational speed information that indicates, for example, a target voltage sufficient to drive the motor 1320 at the desired rotational speed.

The user interface 1522 of the motor speed control module 1520 outputs the motor speed instruction signal to the PWM circuit 1526 via a communication link 1340. The communication link 1340 may be constituted by any signal communication means suitable for communicating signals between the user interface 1522 and the PWM circuit 1526 of a particular configuration of the motor speed control module 1520, which may include, for example, a wired or wireless communication link. As used herein, a wired communication link may include one or more electrically-conductive wires, serial cables, fiber optic cables, mesh cables, coaxial cables, or other forms of wired connections. In comparison, a wireless communication link, as used herein, may include radio, infrared, satellite, microwave, Internet, Bluetooth, Wi-Fi, Global System for Mobile Communications, General Packet Radio Service, Long Term Evolution, Cellular, or other forms of wireless connections. In one embodiment, for example, the user interface 1522 is in communication with the PWM circuit 1526 via insulated copper wires.

The PWM circuit 1526 may be mounted on a printed board accommodated in the PWM circuit housing 1524. The PWM circuit 1526 is preferably constituted by any analog and/or digital logic circuitry (such as switches, comparators, clocks, gates, input terminals, output terminals, and the like) that functions to modulate a pulse width of a voltage according to the motor speed instruction signal. Alternatively, the PWM circuit 1526 may be constituted by a controller. The controller may include hardware resources for storing and executing software instructions, including, for example, a processing unit, such as a central processing unit ("CPU") or microprocessing unit ("MPU"), a memory device, such as a random access memory ("RAM") and/or read-only memory ("ROM"), input terminals, output terminals, and a plurality of peripherals (such as transistors and the like). Software instructions to determine a PWM voltage signal based on the motor speed instruction signal may be stored in the memory device and referenced by the processing unit to execute the outputting of the PWM voltage signal.

The PWM circuit 1526 may generate the PWM voltage signal based on a duty ratio calculated from the motor speed instruction signal. For example, the PWM circuit 1526 may calculate a duty ratio (50%) by recognizing a target voltage (e.g., 10 volts) indicated by the motor speed instruction signal and comparing such target voltage to the supply voltage (e.g., 20 volts) using one or more comparator(s). The PWM circuit 1526 may modulate the pulse width of the supply voltage according to the duty ratio and output a pulse-width-modulated voltage as the PWM voltage signal to the timing control module 1530.

The timing control module 1530 functions to output a motor control signal to control the timing and rotational speed of rotational operations of the winding unit 1300. The timing control module 1530 includes a user interface 1532, a timer circuit 1534, and a timer circuit housing 1536.

The user interface 1532 of the timing control module 1530 includes one or more time value input devices 1532*a* to receive user input indicative of the desired timing of rotational operations. Each time value input device 1532*a* may be embodied by a knob, dial, wheel, lever, button, touch-screen display, or any other device capable of receiving user input, which generally has indicia that signifies, for example, a trigger signal and/or a time value. The user interface 1532 of the timing control module 1530 may also include one or more time value output devices 1532*b*, such as a display, speaker, or any other device capable of presenting output information that signifies, for example, a time value.

Based on user input indicative of timing received through the time value input device(s) 1532*a*, the user interface 1532 of the timing control module 1530 generates a timing instruction signal. The timing instruction signal may indicate, for example, one or more threshold time value(s) Tth1, Tth2 that correspond(s) to the ending(s) of one or more time interval(s). The user interface 1532 of the timing control module 1530 may output the timing instruction signal to the timer circuit 1534 through a communication link 1342, such as Wi-Fi. Although the user interface 1532 of the timing control module 1530 is, for clarity, described herein as formed separately from the user interface 1532 of the motor speed control module 1520, it is contemplated that both of said user interfaces 1522 and 1532 may be integrated to form a unitary user interface device, such as a microcomputer having a graphical user interface display of user-selectable indicia that signifies, for example, a duty ratio and one or more time value(s).

The timer circuit 1534 of the timing control module 1530 is operable to convert the voltage of the PWM voltage signal to an inconstant voltage and output it as the motor control signal according to the timing instruction signal. The motor control signal has rotational speed and timing information that indicates, for example, a voltage of the PWM voltage signal and output timing according to the timing instruction signal.

The timer circuit 1534 may be mounted on a printed board accommodated in the timer circuit housing 1536. The timer circuit 1534 may be embodied by a controller, such as a programmable logic controller or programmable logic relay. The controller of the timing control module 1530 may include hardware resources for storing and executing software instructions, including, for example, a processing unit, such as a CPU, a memory device, such as RAM and/or ROM, input terminals, output terminals, and a plurality of peripherals (such as timers, comparators, clocks and the like). The memory device may store software instructions to determine a motor control signal based on the timing instruction signal and the PWM voltage signal. The processing unit may reference the software instructions to execute the outputting of the motor control signal.

The peripherals of the controller may include a timer, internal clock, and one or more switching devices in communication with the processing unit. The timer may obtain a time value T by counting an internal clock of the controller. Based on the software instructions, the processing unit compares, for example, the time value T to at least one threshold time value Tth1, Tth2 indicated by the user input set in the timing instruction signal. Upon such comparison, if the time value T equals or exceeds the threshold time value Tth, the processing unit opens or closes the switching device(s) according to the software instructions. The switching device(s) may be interposed between at least one input terminal and output terminal of the controller such that the outputting of the motor control signal is started and stopped by such closing and opening of the switching device(s).

As an alternative to the controller described above, it is contemplated that the timer circuit 1534 may be embodied by any other analog and/or digital logic circuitry configured to generate and output a motor control signal according to the timing instruction signal and the PWM voltage signal.

The motor circuit 1330 of the winding unit 1300 is electrically connected to output terminal(s) of the timing control module 1530 to receive the motor control signal. The motor circuit 1330 functions to drive the motor 1320 to perform rotational operations according to the motor control signal. In particular, the motor circuit 1330 generates a driving voltage signal based on the motor control signal and outputs the driving voltage signal to windings 1328*b* that corresponds to at least one phase of the motor 1320. For example, the motor circuit 1330 may include an inverter with switching devices, such as field effect transistors, connected in a multi-phase bridge configuration. The switching device(s) open and close in a predetermined sequence to convert a direct current voltage of the motor control signal into a multi-phase voltage and output the multi-phase voltage as the driving voltage signal to windings 1328*b* that correspond to at least one phase of the motor 1320. By so doing, sufficient magnetic flux is generated through the windings 1328*b* and field poles 1328*a*2 of the stator 1328 to rotate the rotor 1326 and output shaft 1324 in the first rotational direction. It is contemplated that the motor circuit 1330 may alternatively be implemented by any other analog and/or digital circuitry operable to generate and output such a driving voltage signal based on the motor control signal.

As noted, such rotation of the rotor 1326 and output shaft 1324 generates torque in the first rotational direction, and the torque is applied to the winding implement 1360 via the output shaft 1324. In response, the winding implement 1360 performs a rotational operation by rotating in the first rotational direction, from an initial angular position to a second angular position, at the desired rotational speed. During this rotational operation, a length of the main line 1410 of the line assembly 1400 winds around the outer peripheral surface of the winding implement 1360 in a circumferential direction. By so doing, the main line 1410 is moved so as to induce movement of waterfowl decoys 1800 attached thereto. In addition, tensile force occurring within the line assembly 1400 increases as the winding implement 1360 rotates to its second angular position, causing increasingly greater torque to be applied to the winding implement 1360 in a second rotational direction opposite the first rotational direction. Unless the driving voltage signal is otherwise stopped, the motor 1320 preferably continues to drive rotation of the winding implement 1360 in the first rotational direction until the winding implement 1360 obtains its second angular position, wherein the torque applied to the winding implement 1360 by the motor 1320 may be substantially equal to the torque applied to the winding implement 1360 by the line assembly 1400.

When the driving voltage signal stops, the motor 1320 stops generating torque in the first direction owing to a lack of sufficient magnetic interaction between the permanent magnets 1326*b* of the rotor 1326 and the windings 1328*b* of the stator 1328. Consequently, in response to the torque applied by the line assembly 1400, the rotor 1326, output shaft 1324, and winding implement 1360 rotate in the second rotational direction until the winding implement 1360 has substantially reverted to its initial angular position, thereby unwinding a length of the main line 1410 from around the outer peripheral surface of the winding implement 1360. This unwinding of the main line 1410, likewise, functions to move the waterfowl decoys 1800 attached to the main line 1410. The mounting assembly 1600 is configured to support the power supply unit 1100, the power supply interface 1200, the winding unit 1300, and parts of the control unit 1500 at a predetermined distance above a body of water.

FIGS. 1-4 illustrate the waterfowl motion simulation device 1000 equipped with an exemplary mounting assembly 1600. As shown in FIGS. 1-4, the mounting assembly 1600 generally may include a main support structure 1610, an adjustment sleeve 1620, and a locking mechanism 1630. The main support structure 1610 may be embodied by at least one shaft, pole, rod, or the like made of a sufficiently sturdy material, such as stainless steel, to support the weight of the power supply unit 1100, the power supply interface 1200, the winding unit 1300, and parts of the control unit 1500. The main support structure 1610 may include numerous shafts, poles, rods, or the like configured to be removably connected end-to-end so as to constitute lower, middle, and upper sections respectively of a single, longer shaft, pole, rod or the like. In one embodiment, the length of the main support structure 1610 is approximately 48 inches, but other lengths may be implemented to support the winding unit 1300 at higher or lower distances and to suit characteristics of the environment in which the present invention is practiced, such as water depth.

The main support structure 1610 may have a lower end and an upper end opposite the lower end. As shown in FIG. 4, in one embodiment, the lower end of the main support structure 1610 may be formed to a point or edge to facilitate the insertion of the main support structure 1610 into a ground surface beneath the aquatic environment. In such an embodiment, a peg element 1614 protrudes from the main support structure 1610 in a direction substantially perpendicular to the longitudinal axis of the main support structure 1610. The user may apply a downward force upon the peg element 1614 to further facilitate the insertion of the main support structure 1610 into the ground surface. Additionally, such an embodiment preferably includes a plate element 1612 connected to the main support structure 1610 near the lower end of the main support structure 1610 and beneath the peg element 1614. The plate element 1612 functions to facilitate stability of the main support structure 1610 while inserted in the ground surface. For example, the plate element 1612 may embody a flat plate with a surface area greater in width than that of the main support structure 1610 to increase resistivity to tilting and rotation while inserted in the ground surface.

The adjustment sleeve 1620 is connected to an exterior surface of the winding unit housing 1310 via any suitable means, including, for example, chemical bonding agents (such as adhesives), mechanical connectors (such as bolts, screws, brackets and the like), or thermal bonding (such as melting) with or without a separate bonding agent (such as a polymer with a low melting point). The adjustment sleeve 1620 is configured to slidably receive the main support structure 1610. For example, the adjustment sleeve 1620 may be embodied by a tube that defines a passage shaped to slidably fit over the outer peripheral surface of the main support structure 1610.

The locking mechanism 1630 is operably associated with the adjustment sleeve 1620 to releasably lock the main support structure 1610 within the passage of the adjustment sleeve 1620 at a point along the length of the main support structure 1610. For example, the locking mechanism 1630 may be embodied by a cylindrical shaft with opposing first and second ends, and a grip element connected to the first end of the shaft. External threads, for example, may be formed on a surface of the shaft of the locking mechanism 1630, beginning at the second end of the shaft and extending a distance along the length of the shaft toward the first end of the shaft. A bore with internal threads may, for example, be formed in the adjustment sleeve 1620 to engage with the external threads on the shaft of the locking mechanism 1630. The grip element may be embodied by a handle or multi-sided structure adapted to be gripped by a user's hand or a fastening tool, such as a wrench. When the main support structure 1610 occupies the passage of the adjustment sleeve 1620, the locking mechanism 1630 may be adjusted so as to advance within the bore and into the outer peripheral surface of the main support structure 1610. In a preferred embodiment, holes, groves, notches or the like may be machined in the outer peripheral surface of the main support structure 1610 at spaced apart intervals along its length for detent. Alternatively, it is contemplated that the locking mechanism 1630 may be embodied by any other means recognized in the art as associable with the adjustment sleeve 1620 to releasably lock the main support structure 1610 within the adjustment sleeve 1620 at a point along the length of the main support structure 1610.

Although the mounting assembly 1600 has been described herein with respect to the exemplary mounting assembly 1600 of FIGS. 1-4, it is not to be construed as limited to such exemplary mounting assembly 1600. Indeed, in alternative embodiments, various support appendages may be operatively associated with the main support structure 1610 to secure the main support structure 1610 to objects, such as a tree or a boat. For example, in one alternative embodiment, a tree support appendage may be removably connected to the lower end of the main support structure 1610. The tree support appendage may include, for example, a mounting bracket and a pointed screw that is connected to and protrudes outwardly from a back side of the mounting bracket. The main support structure 1610 may be pivotally supported within the mounting bracket. The main support structure 1610 may pivot from a position in which its longitudinal axis is substantially parallel to the screw (a "collapsed position") to a position in which its longitudinal axis is substantially perpendicular to the screw (an "upright position"). Apertures may be machined in the mounting bracket and the lower end of the main support structure 1610 such that the apertures of the mounting bracket and the lower end of the main support structure 1610 align when the main support structure 1610 is in the upright position. A pin may be inserted through the aligned apertures to fix the main support structure 1610 in the upright position. The screw may be advanced within a tree to support the waterfowl motion simulation device 1000 on the side of the tree.

In a second alternative embodiment, a ledge support appendage may be connected to the lower end of the main support structure 1610. The ledge support appendage may include an L-shaped support member, and a hook member. The L-shaped support structure has a lower portion and an upper portion that bends and extends in an upward direction perpendicular to the lower portion. The main support structure 1610 protrudes upwardly from the lower portion of the L-shaped support member, and the hook member is connected to the upper portion of the L-shaped support member. The hook member includes a hook portion and a sleeve portion. The sleeve portion may define an inner cavity, and the upper portion of the L-shaped support member may be pivotally connected within the sleeve portion of the hook member such that the hook portion faces outwardly and downward in relation to the main support structure 1610. The inner cavity of the sleeve portion may widen in direct proportion with distance from the point of pivotal connection to facilitate the pivoting of the L-shaped support member within the sleeve portion. The hook portion may be fitted over a ledge, such as a ledge formed by a hull of a boat, to support the waterfowl motion simulation device 1000 on the ledge. A pin may be inserted through apertures formed in the sleeve portion of the hook member and in the L-shaped support member to support the L-shaped support member at various angles relative to the ledge.

The waterfowl motion simulation device 1000 may be provided as a kit of parts, the kit of parts including: (i) the line assembly 1400 for connecting to waterfowl decoys 1800; (ii) the winding unit 1300 for winding and unwinding the line assembly 1400 from one end of the line assembly 1400; (iii) an artificial anchor for securing an opposite end of the line assembly 1400 at a distance apart from the winding unit 1300; (iv) the control unit 1500 for controlling the winding and unwinding of the line assembly 1400 by controlling the winding unit 1300; and (v) a power supply unit 1100 for powering the control unit 1500 and the winding unit 1300. In a preferred embodiment, the kit of parts also includes a mounting assembly 1600 (such as a land mounting assembly 1600) for supporting the winding unit 1300, the power supply unit 1100, and the control modules 1520, 1530 above a body of water. The control modules 1520, 1530 may be installed inside the winding unit housing 1310 during manufacture, and, in a preferred embodiment, the adjustment sleeve 1620 may be installed on the exterior surface of the winding unit housing 1310 during manufacture. According to one method, the waterfowl motion simulation device 1000 may be assembled from the kit of parts by mounting the winding unit 1300 and control modules 1520, 1530 at a desired distance above the body of water using the mounting assembly 1600. The main line 1410 of the line assembly 1400 may be inserted through the opening of the winding implement cover 1370 and connected to or within the outer peripheral surface of the winding implement 1360. One end of the anchor appendage 1430 may be connected to the artificial anchor and the opposite end of the anchor appendage 1430 may be connected to the main line 1410. The artificial anchor may be secured in a ground surface at a distance apart from the winding unit 1300 such that the line assembly 1400 is sufficiently taut between the anchor and the winding unit 1300 to allow a length of the main line 1410 to be wound and unwound by the winding unit 1300 and to move in response thereto. Waterfowl decoys 1800 may be connected to the line assembly 1400 via the decoy attachment appendages 1420 of the line assembly 1400 and then distributed in the body of water. The power supply unit 1100 may be operably engaged with the power supply interface 1200 to power the control unit 1500. A user may then provide user input to the control unit 1500 via the user interface(s) of the control modules 1520, 1530 to control the winding unit 1300 to execute rotational operations to wind and unwind the line assembly 1400, thereby affecting movement of the waterfowl decoys 1800 in the body of water.

Figure 8:
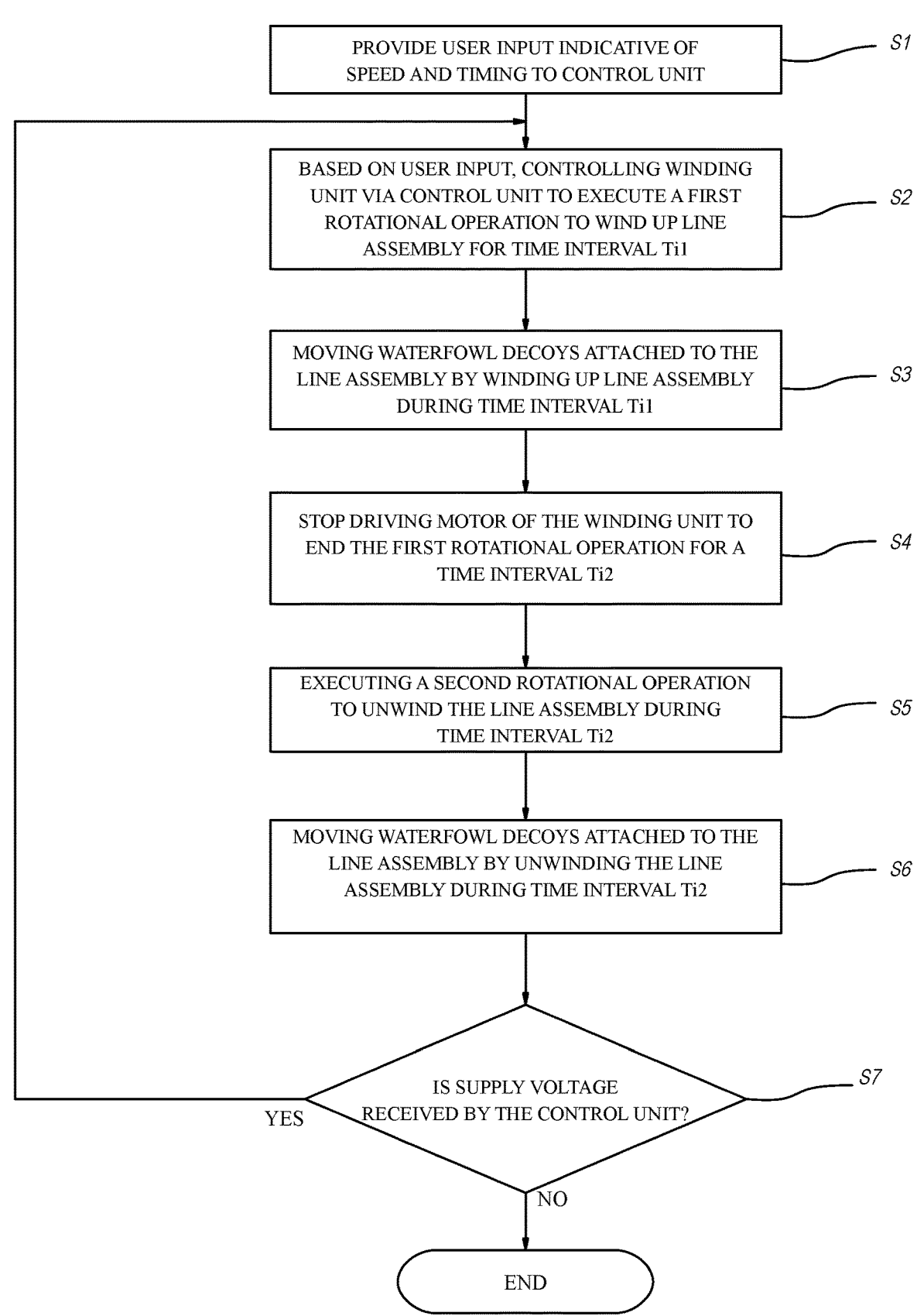
FIG. 8 is a flowchart of an exemplary method of using the waterfowl motion simulation device to move waterfowl decoys.

Rotational operations according to an embodiment of the waterfowl motion simulation device 1000 will be described hereinafter with reference to FIG. 8. In general, the waterfowl motion simulation device 1000 executes rotational operations to affect movement of waterfowl decoys 1800 attached to the line assembly 1400 and distributed in a body of water. In describing said rotational operations, it is to be understood that software instructions appropriate to execute such rotational operations are prestored in one or more memory device(s) of the control unit 1500. It is also to be understood that the torque applied to the winding implement 1360 by the motor 1320 is sufficiently greater than that applied to the winding implement 1360 by the line assembly 1400 to rotate the winding implement 1360 in a first rotational direction from an initial angular position to a second angular position.

In step S1, the user provides user input indicative of a desired rotational speed of the motor 1320 and timing of rotational operations to the control unit 1500 via the user interface(s) of the control modules 1520, 1530. For example, the user may manipulate a speed input device 1522*a* of the user interface 1522 of the motor speed control module 1520 to input information of the desired rotational speed of the motor 1320 into the motor speed control module 1520. The user may manipulate a time value input device 1532*a* of the user interface of the timing control module 1530 to input information of the desired timing of rotational operations into the timing control module 1530.

Upon receiving the user input, the control unit 1500 sets information of the desired rotational speed of the motor 1320 and timing of rotational operations included in the user input. For example, based on the user input received through the speed input device 1522*a*, the user interface of the motor speed control module 1520 may set a motor speed instruction signal containing information indicative of the desired rotational speed of the motor 1320 (e.g., a target voltage sufficient to drive the motor 1320 at the desired rotational speed). Similarly, based on the user input received through the time value input device 1532*a*, the user interface of the timing control module 1530 may set a timing instruction signal containing information indicative of the desired timing of rotational operations (e.g., time values indicative of time intervals during which to execute and/or delay executing rotational operations). For brevity, the motor speed instruction signal and the timing instruction signal may collectively be referred to herein as the "instruction signals" when unnecessary to distinguish therebetween. Once the instruction signals are set, the motor speed instruction signal is output to the PWM circuit 1526, and the timing instruction signal is output to the timer circuit 1534. The instruction signals may be retained by the control unit 1500 such that user input does not need to be provided on each subsequent occasion that the waterfowl motion simulation device 1000 is practiced.

In steps S2 and S3, the control unit 1500 controls the winding unit 1300 to move the waterfowl decoys 1800 by executing a first rotational operation to wind the line assembly 1400 around the winding implement 1360 according to the rotational speed indicated by the user input for a predetermined time interval Ti1.

In particular, the control unit 1500 outputs to the winding unit 1300 a motor control signal that has a voltage sufficient to drive the motor 1320 of the winding unit 1300 at the desired rotational speed. To do so, the control unit 1500 generates a PWM voltage signal that has a voltage indicating the desired rotational speed of the motor 1320. For example, based on the supply voltage and the motor speed instruction signal, the motor speed control module 1520 determines and sets a duty ratio of the PWM voltage signal by recognizing a target voltage indicated by the motor speed instruction signal and comparing the target voltage to the supply voltage. The motor speed control module 1520 then generates the PWM voltage signal according to the duty ratio by modulating the pulse width of the supply voltage. The PWM voltage signal is thereafter output to and received by the timing control module 1530 of the control unit 1500.

The timing control module 1530 converts the voltage of the PWM voltage signal to an inconstant voltage and outputs it as the motor control signal during the first predetermined time interval Ti1 indicated by the timing instruction signal. For example, a controller of the timing control module 1530 references software instructions that indicate timing information of the timing instruction signal to determine the duration of the time interval. According to the software instructions, the controller controls switching device(s), for example, to energize the output terminal(s) with the voltage of the PWM voltage signal during the time interval. The motor control signal is thereby output from the control unit 1500 to the winding unit 1300 via the output terminal(s).

The control unit 1500, in particular, outputs the motor control signal to the motor circuit 1330 of the winding unit 1300. Based on the motor control signal, the motor circuit 1330 outputs a driving voltage signal to drive the motor 1320 to rotate in the first rotational direction. For example, an inverter of the motor circuit 1330 may convert the motor control signal to a multi-phase voltage and output it as the driving voltage signal to windings 1328*b* of the motor 1320 sequentially according to a predetermined timing. According to the driving voltage signal, the windings 1328*b* within the various phases of the motor 1320 are energized to generate magnetic fields of sufficient magnetic flux in an order that interacts with the magnetic fields of the permanent magnets 1326*b* of the rotor 1326 to induce rotation of the rotor 1326 and output shaft 1324 in the first rotational direction at the desired rotational speed, thereby generating torque in the first rotational direction.

The torque generated by the motor 1320 is applied to the winding implement 1360 through the output shaft 1324 to drive rotation of the winding implement 1360 in the first rotational direction at the desired rotational speed. The winding implement 1360 is rotated in the first rotational direction, from its initial angular position to a second angular position, to wind a length of the main line 1410 of the line assembly 1400 around the outer peripheral surface of the winding implement 1360 in a circumferential direction. In response, the main line 1410 tautens and is pulled toward the winding implement 1360, causing the waterfowl decoys 1800 attached to the line assembly 1400 to move responsively in a body of water. In addition, as the main line 1410 winds around the winding implement 1360 as described, a tensile force occurs within the line assembly 1400 owing to the force of the anchor 1700 acting on the line assembly 1400 in a direction biased to that of the force of the winding unit 1300 acting on the line assembly 1400. This tensile force gradually increases as more of the line assembly 1400 is wound around the winding implement 1360 and increasingly applies torque to the winding implement 1360 in the second rotational direction until the winding implement 1360 obtains its second angular position. The winding implement 1360 preferably obtains its second angular position when the torque applied to the winding implement 1360 by the motor 1320 is substantially equal to the torque applied to the winding implement 1360 as a result of the tensile force occurring within line assembly 1400.

In executing steps S4, S5, and S6, after the first rotational operation, the control unit 1500 controls the winding unit 1300 to move waterfowl decoys 1800 by executing a second rotational operation to unwind the line assembly 1400 from around the winding implement 1360. In particular, the control unit 1500 stops the outputting of the motor control signal to the motor circuit 1330 of the winding unit 1300 to complete S4, which causes the motor 1320 to stop applying torque to the winding implement 1360 in the first rotational direction (owing to a lack of sufficient magnetic interaction between the rotor 1326 and stator 1328). In response to the torque applied by the tensile force occurring in the line assembly 1400, the winding implement 1360 rotates in the second rotational direction, from its second angular position to substantially its initial angular position, to execute the second rotational operation of step S5, unwinding a length of the line assembly 1400 from around its outer peripheral surface. As a result, the main line 1410 is untensed and retracts away from the winding unit 1300, causing the waterfowl decoys 1800 attached to the main line 1410 to move responsively in a body of water and completing step S6.

In step S7, unless deactivated (i.e., the supply voltage is no longer supplied to the control unit 1500), the control unit 1500 may control the winding unit 1300 to repeat steps S2 through S6 according to the timing indicated by the user input.

For example, according to one embodiment, the control unit 1500 may control the winding unit 1300 to repeat steps S2 through S6 during recurrent spaced-apart time intervals indicated by user input set in the timing instruction signal. In such embodiment, according to the timing instruction signal and prestored software instructions, the timing control module 1530 may output the motor control signal to the motor circuit 1330 during the recurrent spaced-apart time intervals. For example, the processing unit of the controller of the timing control module 1530 may start a timer to obtain a time value T by counting an internal clock of the controller, and the processing unit compares the time value T to a first threshold time value Tth1, such as 300 s, indicated by the timing instruction signal as the end of a time interval Ti2. The processing unit may repeat this comparison in regular time intervals of shorter duration, such as 0.10 s intervals, until the time value T is equal to or exceeds the first threshold time value Tth1. Upon the processing unit recognizing a time value T equal to or exceeding the first threshold time value Tth1, the processing unit closes one or more switching device(s) interposed between the input terminals and output terminals of the controller, thereby outputting the motor control signal to the motor circuit 1330. Substantially simultaneously, the processing unit may stop, reset, and restart the timer to recommence obtaining time value T by counting the internal clock. The processing unit compares the time value T to a second threshold time value Tth2, such as 2.5 s, indicated by the timing instruction signal as the end of a time interval Ti2 and may repeat this comparison in regular time intervals of shorter duration until the time value T is equal to or exceeds the second threshold time value Tth2. Upon the processing unit recognizing a time value T equal to or exceeding the second threshold time value Tth2, the processing unit may stop, reset, and restart the timer, and open the switching device(s) to stop outputting the motor control signal to the motor circuit 1330. The timing control module 1530 then repeats steps S2 through S6 until deactivated.

The principles, preferred embodiment, and mode of operation of the present invention have been described in this specification. All references cited in this specification are hereby incorporated by reference insofar as there is no inconsistency with the disclosure of this specification. In interpreting this specification, all of the terms used to describe the present invention should be given the broadest interpretation consistent with the context. For example, the terms "comprises," "comprising," "includes," "including," and "having," are inclusive and therefore specify the presence of stated features, integers, steps, elements, operations, and/or components, but do not preclude the presence or absence of other features, integers, steps, elements, operations, components, and/or groups thereof. The conjunctive term "and/or," or terms of similar import, shall be understood to be inclusive of any and all combinations of the items listed in connection with such term. Ordinal numbers, such as "first," "second," and "third," are used to distinguish between various constituent elements for convenience and do not denote the order of constituent elements so distinguished. Further, directional terms, such as "top," "bottom," "upper," "lower," "left," "right," "upward," and "downward," are used to clarify and describe the relationship between various constituent elements of specific embodiments of the present invention, but do not denote absolute orientation. Therefore, such terms vary according to the orientation of the present invention. In addition to the foregoing terminological considerations, specific embodiments referenced in describing the present invention are not to be regarded as exhaustive or as limiting to the full scope of the present invention. Other persons may modify the disclosed embodiments, or employ equivalents thereof, without departing from the scope and spirit of the present invention.

I hereby claim the following:

1. A waterfowl motion simulation device which is to be connected to waterfowl decoys to affect the motion of the waterfowl decoys in an aquatic terrain, wherein the waterfowl motion simulation device comprises:

a. a winding unit formed by a motor accommodated inside a winding unit housing and having an output shaft with an end that protrudes from the winding unit housing, a winding implement secured to the end of the output shaft to be rotatable by the motor via the output shaft, and a winding implement cover provided on an exterior surface of the winding unit housing to substantially cover the winding implement;

b. a line assembly having a plurality of decoy attachment appendages to connect to the waterfowl decoys, a main line to which the plurality of decoy attachment appendages is connected that is configured to be wound and unwound with respect to the winding implement in response to the winding implement being rotated bi-directionally, and an anchor appendage configured to connect the main line to an anchor;

c. a control unit having at least one user interface, wherein the control unit is configured to control the motor of the winding unit based on user input received via the at least one user interface to bi-directionally rotate the winding implement;

d. a power supply unit configured to supply a voltage;

e. a power supply interface that is adapted to removably engage with and support the power supply unit on the exterior surface of the winding unit housing, and through which the control unit is electrically connected to the power supply unit; and f. a mounting assembly configured to adjustably support at least in part the power supply unit, the power supply interface, the winding unit, and the control unit above the aquatic terrain, the mounting assembly comprising:

i. an adjustment sleeve that defines a passage, and is connected to the exterior surface of the winding unit housing;

ii. a main support structure configured to be slidably received within the passage of the adjustment sleeve, wherein the main support structure has an upper end and a lower end opposite the upper end; and iii. a locking mechanism operably associated with the adjustment sleeve to releasably lock the main support structure inside the passage of the adjustment sleeve;

iv. a peg element that protrudes from the main support structure in a direction substantially perpendicular to a longitudinal axis of the main support structure, and v. a plate element connected to the main support structure nearer to the lower end of the main support structure than the peg element.

2. The waterfowl motion simulation device of claim 1, wherein the winding unit housing comprises:

a. a container having an opening defined by a rim;

b. a cover configured to be connected to the rim to define an inner cavity in which the motor is accommodated; and c. a plurality of claw elements rotatably secured on the container externally at points around a periphery of the rim.

3. The waterfowl motion simulation device of claim 1, wherein the waterfowl motion simulation device further comprises an artificial anchor configured to be secured to the line assembly via the anchor appendage and inserted in a ground surface.

4. The waterfowl motion simulation device of claim 1, wherein the anchor appendage of the line assembly comprises an elastic line, and a plurality of mechanical connectors interconnected by the elastic line, wherein the elastic line in conjunction with the plurality of mechanical connectors is configured to elastically interconnect the main line of the line assembly to the anchor.

5. The waterfowl motion simulation device of claim 1, wherein the power supply unit comprises at least one battery accommodated inside a power supply housing.

6. The waterfowl motion simulation device of claim 5, wherein the at least one battery is configured to output a voltage of 20 volts.

7. A method of using the waterfowl motion simulation device of claim 1 to move at least one waterfowl decoy in an aquatic terrain, wherein the method comprises the steps of:

a. positioning the waterfowl motion simulation device above the aquatic terrain at a distance from the anchor;

b. securing the main line of the line assembly to the anchor via the anchor appendage;

c. connecting the at least one waterfowl decoy to the main line of the line assembly via at least one of the plurality of decoy attachment appendages;

d. providing user input indicative of rotational speed and timing of rotational operations of the winding unit to the control unit via the at least one user interface;

e. outputting a motor control signal, based on the user input, from the control unit to the motor of the winding unit;

f. based on the motor control signal, the motor applying torque to the winding implement in a first rotational direction for a first time interval to perform a first rotational operation of rotating the winding implement in the first rotational direction during the first time interval;

g. by rotating the winding implement in the first rotational direction, winding the line assembly with respect to the winding implement to move the at least one waterfowl decoy in the aquatic terrain;

h. at the end of the first time interval, based on the motor control signal, the motor stopping application of torque to the winding implement in the first rotational direction for a second time interval to perform a second rotational operation of rotating the winding implement in a second rotational direction during the second time interval in response to torque applied to the winding implement by the line assembly; and i. by rotating the winding implement in the second rotational direction, unwinding the line assembly with respect to the winding implement to move the at least one waterfowl decoy in the aquatic terrain.

8. The method of claim 7, wherein the method further comprises the step of repeating steps (e)-(i) at least one more time.

\* \* \* \* \*